C. S. WRIGHT.
GEARING.
APPLICATION FILED JULY 30, 1913. RENEWED JAN. 22, 1916.
1,182,336.
Patented May 9, 1916.
2 SHEETS—SHEET 2.
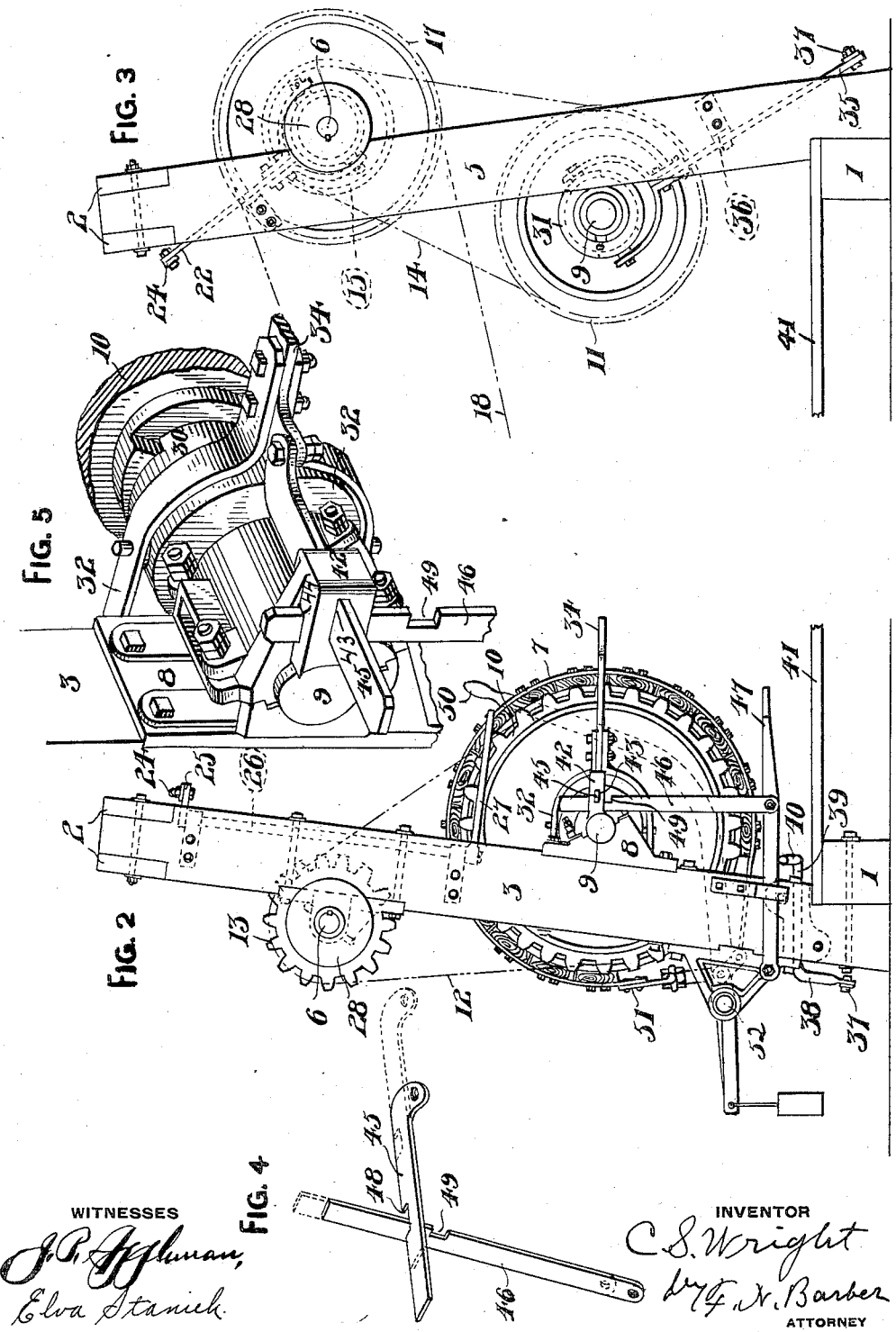
WITNESSES
INVENTOR
C. S. Wright
by F. N. Barber
ATTORNEY

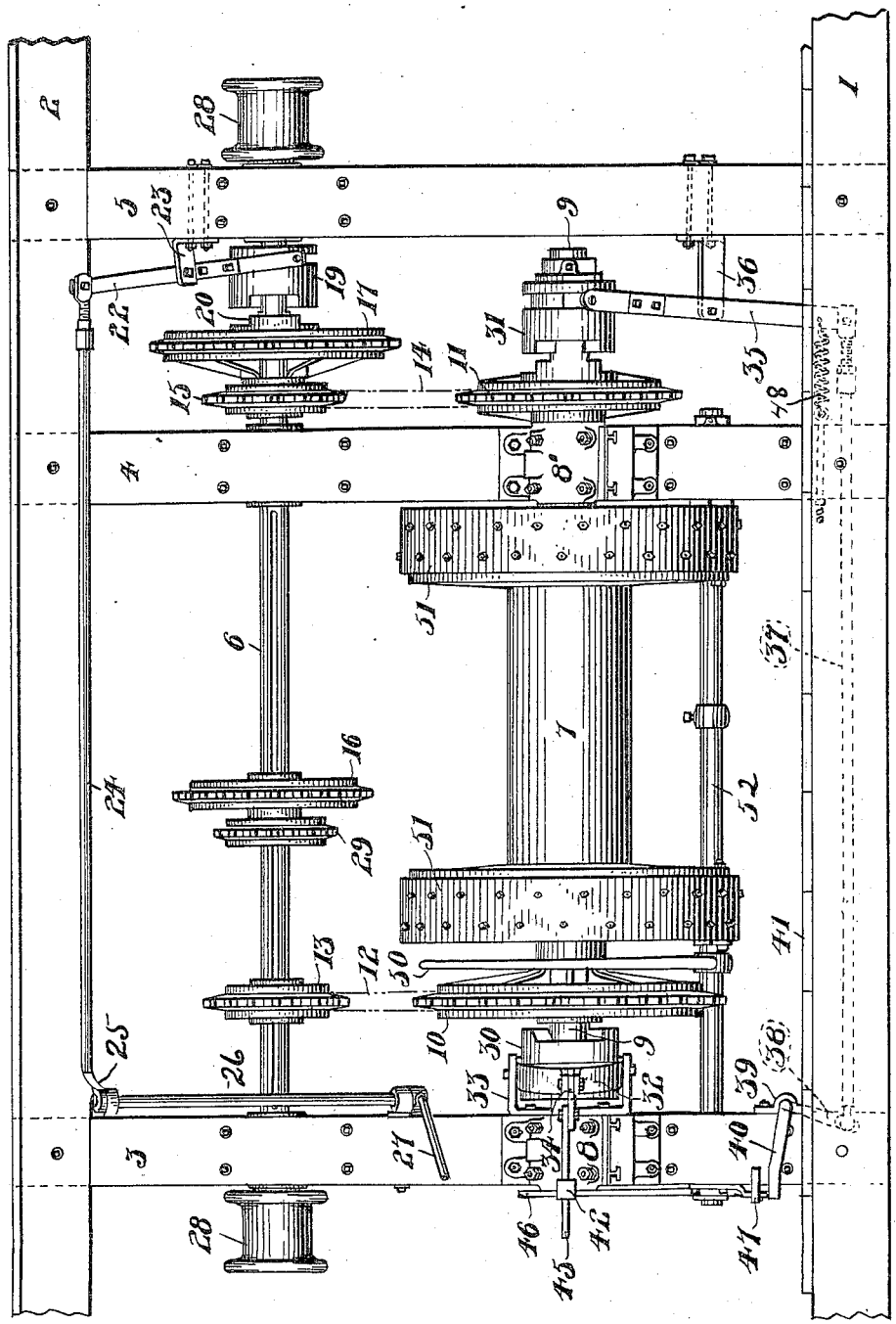

UNITED STATES PATENT OFFICE.

CLYDE S. WRIGHT, OF TOLEDO, OHIO, ASSIGNOR TO THE NATIONAL SUPPLY COMPANY, OF TOLEDO, OHIO, A CORPORATION OF OHIO.

GEARING.

1,182,336.     Specification of Letters Patent.     Patented May 9, 1916.

Application filed July 30, 1913, Serial No. 782,126. Renewed January 22, 1916. Serial No. 73,757.

*To all whom it may concern:*

Be it known that I, CLYDE S. WRIGHT, a citizen of the United States, residing at Toledo, in the county of Lucas and State of Ohio, have invented new and useful Improvements in Gearing, of which the following is a specification.

My invention relates to apparatus for pulling pipes or letting them down in drilled holes.

It is the object of my invention to provide a rotary drilling outfit with an apparatus of the character just mentioned, which allows the operator to stop the running of the sprocket-chain to the rotary table while the said apparatus is used for pulling pipe or letting the same down in the holes, whereby the danger to the workmen is lessened, and the wear on the chain is reduced.

Other objects are to prevent the simultaneous engagement of the drum by two clutches driven at different speeds, and to improve the manner in which the operator actuates the several clutches.

Other minor objects appear hereinafter.

Referring to the accompanying drawings, Figure 1 is a side elevation of a draw-works embodying my invention; Fig. 2, an end elevation looking toward the right on Fig. 1; Fig. 3, an end elevation looking toward the left on Fig. 1; Fig. 4, a detail of the interlocking bars for the drum clutches; and Fig. 5, a perspective of the clutch-interlocking mechanism and adjacent parts.

On the drawings, 1 is the bed member, 2 the top member, and 3, 4, and 5 the connecting members for the members 1 and 2, the said members constituting a frame for supporting the mechanism of my improved draw-works.

The horizontal drive-shaft 6 has its bearings supported by the members 3, 4, and 5, and the drum 7 has its bearings 8, 8′ supported by the members 3 and 4, 9 representing the shaft to which the drum is rigidly connected. The shaft 9 is provided with the two sprocket-wheels 10 and 11, both loose on the shaft, the former being larger than the latter, the sprocket wheel 10 being connected by the sprocket-chain 12 to the sprocket-wheel 13 on the drive-shaft 6, and the sprocket-wheel 11 being connected by the sprocket-chain 14 to the sprocket-wheel 15 on the said drive-shaft.

16 is a sprocket-wheel secured to the drive-shaft 6 which sprocket-wheel is driven from an engine or other motor, not shown.

17 is a sprocket-wheel loose on the shaft and provided with the sprocket-chain 18 for driving the well-known rotary, or rotary table, of a drilling outfit. The shaft 6 has thereon the slidable clutch member 19 rotatable with the shaft.

20 is the clutch member fixed to the sprocket-wheel 17. The clutch member 19 is slid into and out of engagement with the member 20 by means of the clutch lever 22 pivoted between its ends to the bracket 23 on the member 5. The outer end of the lever 22 is connected by the link 24 to the upper arm 25 on the upright rock-shaft 26 having bearings connected to the member 3. The lower end of the shaft 26 is provided with the arm or handle 27 located a little above the bearing 8.

The shaft 6 is provided with the winches 28 of usual form. The speed of the shaft 6 may be varied by using the smaller drive-sprocket 29 instead of the sprocket 16.

The shaft 9 is provided with the two clutch members 30 and 31 slidable thereon and rotatable therewith, the former adapted to interlock with the sprocket-wheel 10, and the latter with the sprocket-wheel 11. The clutch-member 30 is slid on the shaft 9 by the yoke 32 pivoted to the bracket 33. The yoke is provided with the handle 34 extending substantially at a right angle to the shaft 9 and located so as to be engageable by the right knee of the operator as he stands facing the member 3. The clutch-member 31 is slid on the shaft 9 by the clutch lever 35 pivoted between its ends to the bracket 36 on the member 5 below the shaft 9. The lower end of the lever 35 extends down back of the bottom member 1 so as to be beyond the floor 41, and is connected by the link 37 to the arm 38 on the rock-shaft 39 which extends to the forward side of the frame, where it is provided with the arm 40 lying in front of the member 3 just above the floor 41. The spring 48 normally holds the clutch-member 31 away from the sprocket-wheel 11.

The bearing 8 is provided with the forwardly projecting guide-block 42 having the horizontal hole 43 and the vertical hole 44, the holes crossing each other at one side or for a portion of their width. The flat horizontal bar 45 pivoted to the yoke 32 or a lug on the arm 34 is slidable in the hole 43, and the flat vertical bar 46 has its lower end pivoted to the foot-lever 47 and is slidable in the hole 44. The bars 45 and 46 are provided on their adjacent edges with the notches 48 and 49, respectively, the depth of the notches preferably equaling the distance that the said holes cross each other. The notch in one bar is of such a depth that the other bar can be moved across this notch provided this notch is opposite the hole in which the second bar slides. One bar can be caused to enter the notch in the other bar by bringing both notches 48 and 49 opposite the holes 43 and 44, and when one bar has entered the notch in the other bar, by the operation of one clutch member 30 or 31, the latter bar is locked so that it cannot be slid in the block 42 sufficiently to permit the other clutch member to be operated.

The foot-lever 47 rests on the arm 40. The spring 48 holds clutch member 31 on shaft 9 open, then clutch member 30 on shaft 9 being open the bars 45 and 46 will have their notches opposite each other. If the lever 34 be pushed to the right by the operator's knee the clutch member 30 becomes locked to the sprocket-wheel 10 and the bar 45 is drawn to the right also and caused to enter the notch 49 in the bar 46, thereby preventing the operator from moving the clutch-member 31 into engagement with the sprocket wheel 11. If the operator had moved the lever 47 instead of the lever 34, the shaft 9 would have been connected to the sprocket-wheel 11 and the bar 46 would have been drawn down in the notch 48, as shown in full lines on Fig. 4, and the clutch member 30 could not have been connected to the sprocket-wheel 10.

When it is desired to use the drum 7 to raise or lower pipe or for any other purpose, it is desirable that the chain 18 for driving the well-known rotary shall not travel, as it not only wears out the chain and the table, but it is also dangerous to the workmen about the well being drilled. Accordingly, the operator actuates the handle 27 so as to slide the clutch-member 19 away from the member 20, whereupon the sprocket-wheel 17, the chain 18, and the parts driven thereby come to rest.

50 is the brake lever for actuating the brake-bands 51 on the drum-heads. The shaft 52 is actuated directly by the lever 50 and the shaft 52 operates the brake-bands in the usual manner.

All the handles and operating levers 27, 34, 47, and 50 are arranged close together where the operator can apply his left hand to the handle 27, his right hand to the brake-lever 50, his right knee to the lever 34, and his left foot to the lever 47 without shifting his position bodily.

I claim—

1. In a draw-works for drilling outfits, a shaft, two clutches for driving the same, a device for operating each clutch, a guide-block having holes crossing each other at one side, and a separate bar connected to each clutch-operating device and slidable in each hole, there being a notch in the edge of each bar permitting one bar to pass through the notch in the other bar when both notches are opposite each other.

2. In a draw-works for a drilling outfit, a shaft, a driving clutch therefor at each end thereof, a handle at one of said ends for operating one clutch, a foot lever located below the handle, a lever at the other end of the shaft for operating the other clutch, a two-armed rock-shaft having one arm beneath the foot lever, and a link connecting the clutch lever with the second arm on the rock-shaft.

3. In a draw-works for a drilling outfit, a shaft, a driving clutch therefor at each end thereof, a handle at one of said ends for operating one clutch, a foot lever located below the handle, a lever at the other end of the shaft for operating the other clutch, a pivoted device arranged to be operated by the foot lever, and an operating means connecting the clutch lever with the pivoted device.

4. In a draw-works for a drilling outfit, a frame, two shafts supported by the ends thereof, driving connections between the ends of the shafts, each driving connection including a clutch, a handle at one end of the frame for operating one clutch, a foot lever below the handle, a lever at the other end of the frame for operating the other clutch, a movable device arranged to be operated by the foot lever, and an operating means connecting the second lever to the movable device.

Signed at Toledo, Ohio this 24 day of July, A. D. 1913.

CLYDE S. WRIGHT.

Witnesses:
H. R. NOFTZ,
M. N. TABER.